March 19, 1957    E. BOBARD    2,785,727
PNEUMATIC TIRE AND WHEEL CONSTRUCTIONS
Filed July 7, 1954    4 Sheets-Sheet 1
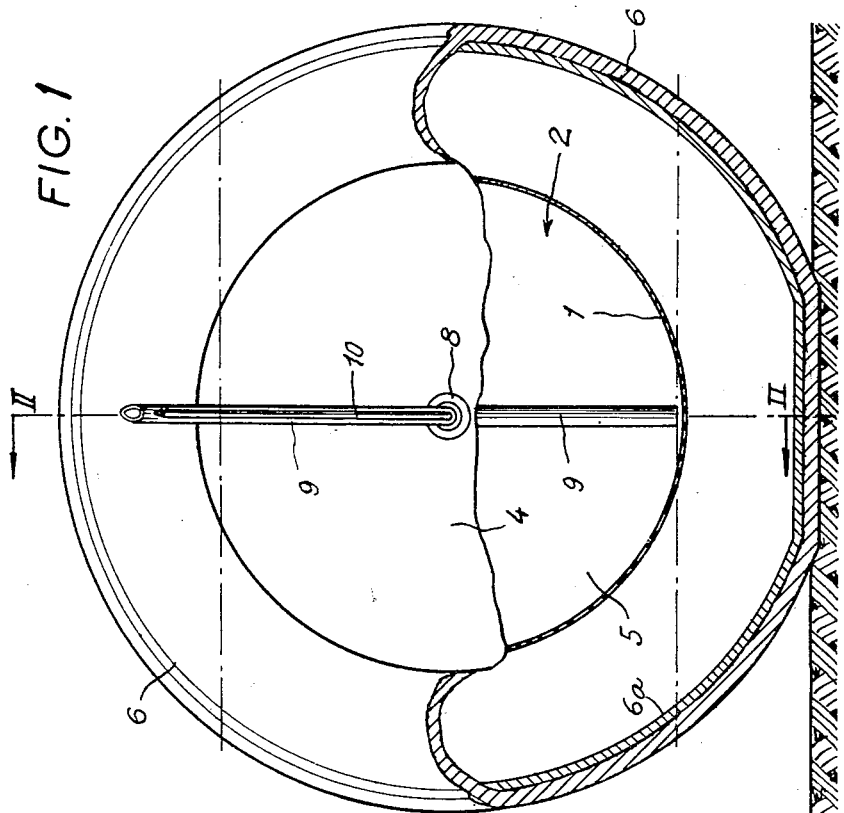
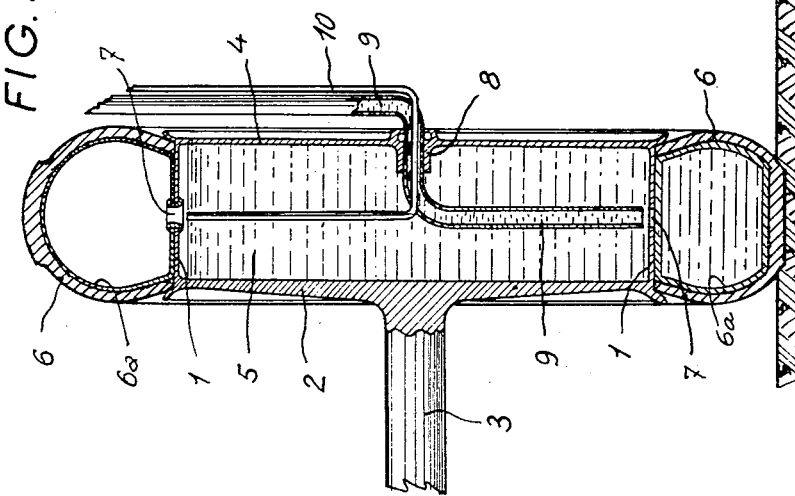

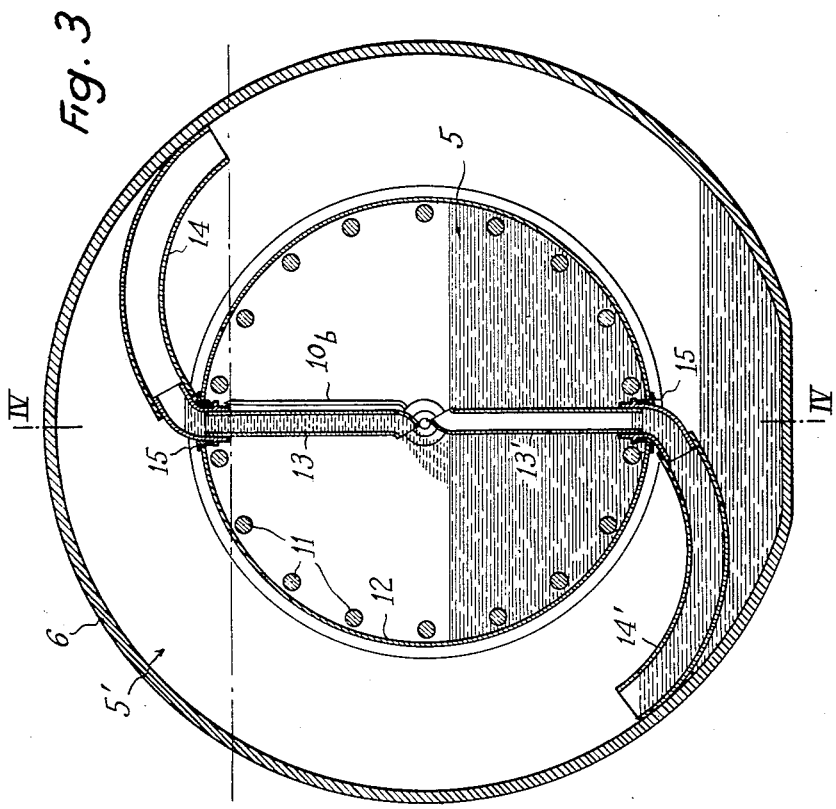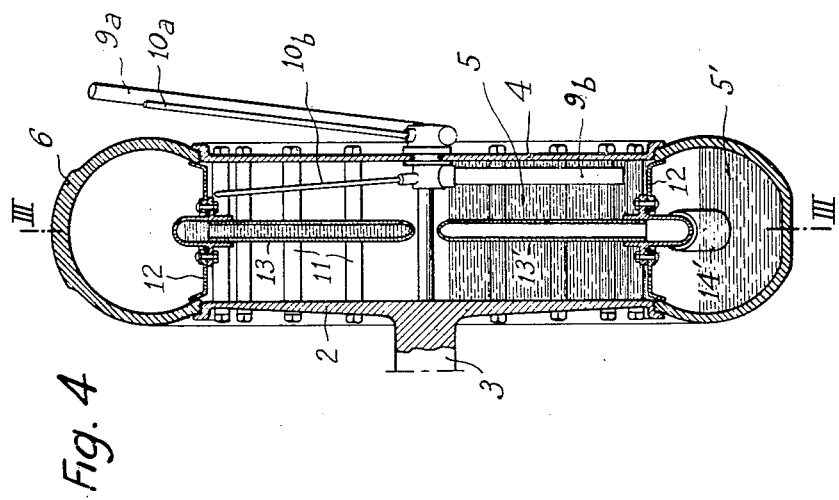

March 19, 1957     E. BOBARD     2,785,727
PNEUMATIC TIRE AND WHEEL CONSTRUCTIONS
Filed July 7, 1954     4 Sheets-Sheet 3
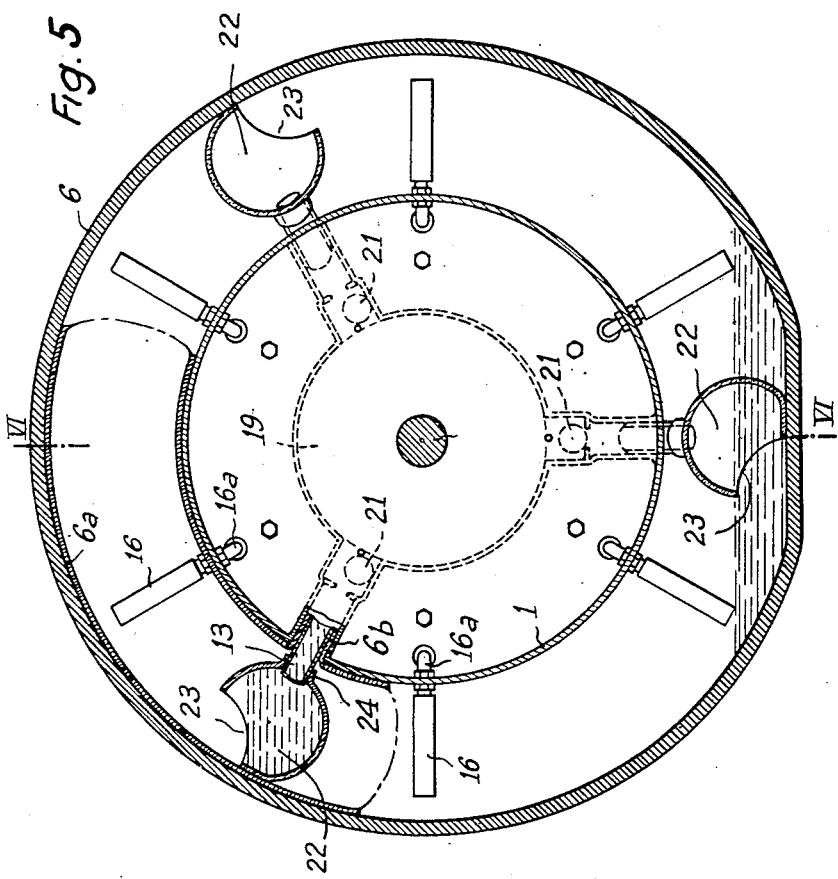
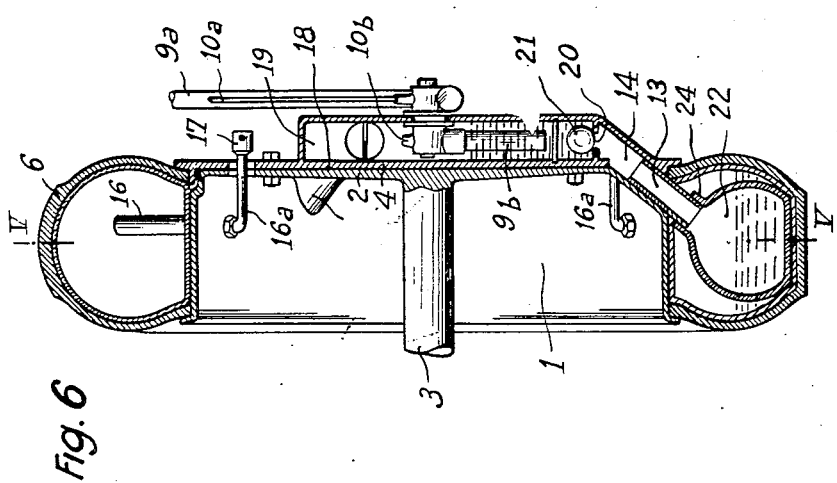

March 19, 1957  E. BOBARD  2,785,727
PNEUMATIC TIRE AND WHEEL CONSTRUCTIONS
Filed July 7, 1954  4 Sheets-Sheet 4
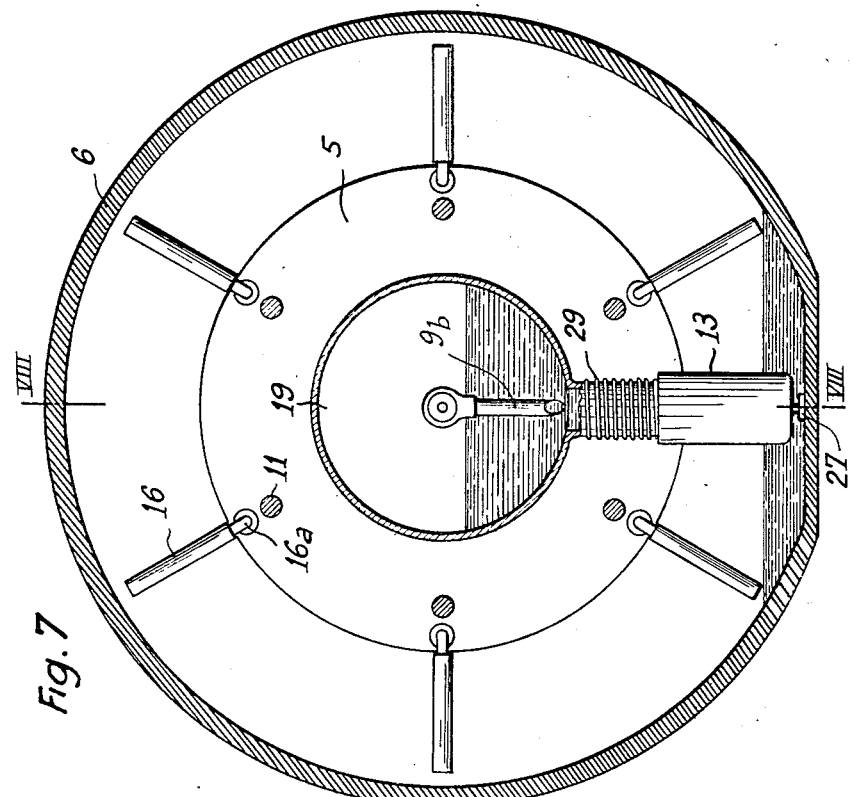
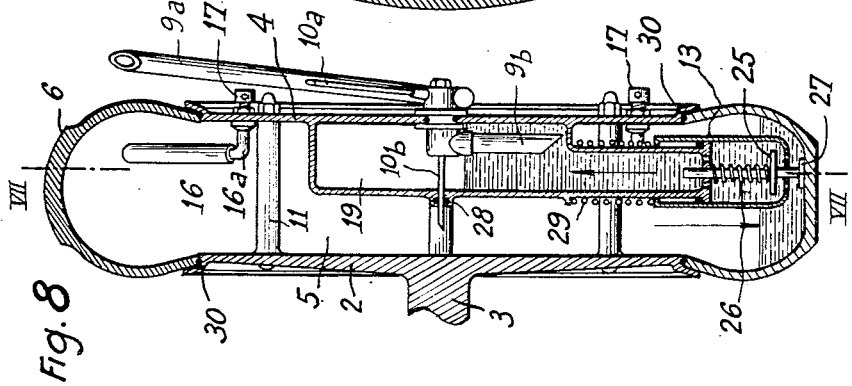

United States Patent Office 2,785,727
Patented Mar. 19, 1957

2,785,727

PNEUMATIC TIRE AND WHEEL CONSTRUCTIONS

Emile Bobard, Beaune, France

Application July 7, 1954, Serial No. 441,838

Claims priority, application France July 10, 1953

11 Claims. (Cl. 152—330)

At the present time the hollow tires of vehicles are sometimes used as a receptacle for a liquid to provide ballast in the wheels, but the filling and the emptying are effected when the vehicle is stationary by a valve specially provided for this purpose.

The object of the present invention is to provide improvements relating mainly to the following matters:

(a) The filling and the emptying of the tire with liquid or of inflation air are carried out continuously (which permits of making the relative quantities of air or liquid vary possibly during driving) by means of a fixed piping passing through the axle of the wheel and rotating with it, this piping comprising preferably a pipe serving at will for the filling or the evacuation of the liquid and an air pipe communicating at will either with the atmosphere or a source of pressure or reduced pressure.

(b) The tire, and in some forms of the invention also the body of the wheel with which it is in communication, form reservoirs for the transport of a liquid employed, for example, for the spraying and watering of plants. The encumbrance of a special reservoir is thereby avoided.

(c) The body of the wheel communicates freely with the interior of the tire, the space forming the reservoir being thus considerably increased.

The filling of the body of the wheel has the effect of subjecting the interior of the wheel to very great axial stresses resulting from the pneumatic pressure, that is to say to the stresses tending to spread apart the two parallel discs of the wheel laterally from each other.

Therefore, the invention provides means for avoiding this disadvantage and at the same time permitting a complete emptying of the tire.

The attached drawings show by way of example some embodiments of the invention, provided more especially for the case where the ballast liquid is an atomized liquid.

Fig. 1 is a side elevation view partly broken away of one form.

Fig. 2 is a vertical diametrical cross section view along the line II—II of Fig. 1.

Fig. 3 is a vertical longitudinal section view of a second form.

Fig. 4 is a vertical diametrical section view along the line IV—IV of Fig. 3.

Fig. 5 is a vertical longitudinal section view of a third form.

Fig. 6 is a vertical diametrical section view along the line VI—VI of Fig. 5.

Fig. 7 is a vertical longitudinal section view of a fourth form.

Fig. 8 is a vertical diametrical section view along the line VIII—VIII of Fig. 7.

In Figures 1 and 2 a wheel of a tractor vehicle of the conventional type is shown, comprising a rim 1 and a disc 2 fixed to a revolving shaft 3. In accordance with the invention the wheel is completed by a second disc 4 producing a reservoir 5 in the interior of the wheel. This wheel is provided with a conventional pneumatic tire 6 with or without an inner tube or air chamber 6a. According to the invention the pneumatic tire 6 or its inner tube communicates with the reservoir 5 through apertures 7. In addition the outer disc 4 carries a bracket 8 through which passes a fixed tube 9 for the supply of liquid extending coaxially through tube 9, where it passes through the bracket 8, is a second tube 10 for air supply. These tubes 9 and 10 extend radially in opposite directions within the rim to the inner wall of the rim 1 as shown in Fig. 1, the ends of the tubes 9 and 10, being at two levels, limit the filling to the height of the upper level—the end of tube 10; and emptying is limited to the lower level—the end of tube 9.

The filling is done either by simply connecting the tube 9 to a force pump, the tube 10 then serving for the escape of air under pressure during the filling, or by suction, the pipe 10 being connected to a source of reduced pressure. As regards the evacuation of the liquid this is done by itself under the action of the inflation of the pneumatic tire, automatically attended to during the driving of the vehicle.

In the embodiment of Figures 3 and 4 in which the pneumatic tire is wholly emptied, there are again the axle of the wheel 3, the discs 2 and 4 of this wheel, the outer tubes for air and liquid 9a and 10a, the pneumatic tire 6, which is here without an inner tube and mounted tightly on the circumference of the discs 2 and 4 forming the rim, in a manner which will be described in more detail.

According to this embodiment these two discs 2 and 4 are connected with each other by tie-rods 11, parallel to the axle, and disposed at a distance from this axle determined solely with a view to resisting as much as possible the forces of relative separation of these two discs.

In order to permit the complete emptying of the space forming the reservoir, and in particular of the pneumatic tire, without being hindered by the tie-rods, the following disposition is provided:

The space 5' of the pneumatic tire is separated from the chamber 5 of the wheel by a circular wall 12 having its peripheral edges bent to form flanges cooperating with the pneumatic tire at the periphery of the rim by pressing its edges against the corresponding edges of the rim. The space 5' communicates with the chamber 5 through rigid, radial tubes 13 and 13', whose outer ends are connected with the flexible tubes 14 and 14', which tend to follow the curvature of the pneumatic tire, whatever its degree of flattening may be.

The positioning of these tubes is ensured by clamping collars 15 fixed on the circumferential wall 12 by bolts.

The flexible tubes 14 and 14', when they are in the low position, permit at each revolution of the wheel, the taking in of a certain quantity of liquid, which is then emptied (when the radial tubes 13 and 13' pass in high position) into the chamber 5, where it remains enclosed at a lower level than the axle of the wheel.

The pneumatic tire being assumed empty of liquid, but normally inflated with air, its filling can be effected by supplying liquid under a pressure greater than the maximum pressure of inflation through the tubes 9a and 9b. The lower half of the chamber 5 is filled at first. Then, when the liquid has reached the upper level of the pipe 13', it flows off through this tube and fills the lower half of the pneumatic tire space 5'. The filling of the two spaces 5 and 5' goes on then simultaneously until the liquid reaches the upper end of the tube for evacuation of air 10b, which extends up to the highest point of the chamber 5.

The variant of the embodiment of Figures 5 and 6 relates more especially to the case where the pneumatic tire alone forms the reservoir, for example in the case of a wheel in the interior of which the mechanical elements are disposed (brake drum or even the traction engine). The two discs 2 and 4 are then very close together and can even be assembled one upon the other at 18, which avoids the necessity of tie rods.

The supply and evacuation system is similar to that of Figures 3 and 4, which has just been described, in this sense that one provides tubes for raising the liquid from the low part of the pneumatic tire. The chamber 5 is omitted and a feed tank 19 is provided to replace it on the outer side of the wheel. This feed tank is connected with the pneumatic tire forming the reservoir by a series of tubes 13 fitting into the thickness of the rim 1 of the wheel. In this embodiment the tubes 13 are simply connected to the circumference of the feed tank 19, the aperture 20 of communication with this feed tank being controlled by the ball valves 21 in such a manner that at the end of the emptying of the pneumatic tire, the liquid contained in the feed tank cannot return into the pneumatic tire. It will be noticed that in this embodiment the tubes raising the water 14 are replaced by flexible cups entirely independent of the pneumatic tire, formed, for example, by a spherical chamber 22 having a large opening 23 and fixed to the end of the tube 13 by a joint 24. These cups are flexible so as to follow, as before, the deformations of the pneumatic tire. It will be observed that they no longer occupy all the lower section of the pneumatic tire so as to raise at each revolution of the wheel only the quantity of liquid necessary for supplying the feed tank and thus not to set in motion the whole of the liquid contained in the pneumatic tire, which would cause an unbalance when the pneumatic tire is half empty.

The outer liquid and air tubes 9a and 10a are mounted as in the preceding embodiment, the interior tube 10b into the interior of the feed tank 19 from where the air can escape during the inflation through the apertures 20 of the upper part of the wheel left open by the ball valves 21.

The unit is completed by a series of flexible tubes 16 for the evacuation of air disposed in the interior of the pneumatic tire and connected with the rigid elbows 16a communicating with the exterior under the control of valves 17. The escape of air during the filling upon stopping of the vehicle is carried out by one of these valves 17 being placed highest on the wheel, the filling of the pneumatic tire with liquid being then practically complete.

In Figs. 5 and 6 the tire has the usual inner tube 6a, in which the raiser cup 22 is disposed, the neck 13 of which is fitted into the corresponding tube 14 by means of a sleeve 6b fixed in the tube 14 of the chamber 19. The air evacuation tubes 16 pass through the inner tube 6a by means of a tube similar to that of the usual inflation valves.

The embodiment of Figures 7 and 8 relates again to the use of the inner chamber 5 of the wheel. Through the tubes 13 the feed tank 19 communicates with the circumference of the pneumatic tire. These tubes 13 are arranged in a special manner so as to permit the raising of the liquid from this peripheral space to the feed tank 19 automatically by the pressure of air prevailing in this space.

For this purpose there is provided at the end of the tube 13 a disc valve 25 subjected to the action of a spring 26 urging the valve on its seat. The stem of the valve extends through the end of tube 13 and has on its end a stop 27. This valve 25 is normally closed and is only opened when in its lowermost position at the moment when the stop 27 is driven by the flattening of the pneumatic tire on the ground. At this moment the pressure prevailing in the capacity of the reservoir causes the driving back of the liquid in the feed tank 19 withdrawn from this pressure since it communicates with the chamber only through the valve 27 and the interior air inlet tube 10b penetrates into the interior of the capacity of the reservoir by means of a tight joint 28.

In this embodiment there is provided another improvement according to which the tube 13 is telescopic so as to be able to be driven in case of a puncture of the pneumatic tire, the two telescopic elements tending to occupy constantly the position shown in the drawing under the action of a spring 29.

In this embodiment the tightness of the rims of the pneumatic tire 6 with the wheel discs 2 or 4 is ensured by a circular guard ring 30 of flexible rubber disposed in a corresponding throat of these parts.

I claim:

1. A vehicle wheel having a pneumatic tire thereon, means for mounting said wheel on a vehicle for rotation, a liquid reservoir rotating with said wheel, means providing communication between said reservoir and said tire, and means non-rotatable with said wheel providing ingress and egress for liquid and air to said reservoir during rotation of said wheel and tire.

2. A vehicle wheel having a pneumatic tire thereon, means for mounting said wheel on a vehicle for rotation, a liquid reservoir rotating with said wheel, means providing communication between said reservoir and said tire, and means coaxial with the wheel axis and non-rotatable with the wheel providing passages for ingress and egress of liquid and air to said reservoir while said wheel and tire are rotating.

3. A vehicle wheel as claimed in claim 1 having tubular extensions of said air and liquid inlet and outlet means, directed upwardly and downwardly respectively, in said reservoir.

4. A vehicle wheel as claimed in claim 1 in which the wheel has side walls and a rim which form the liquid reservoir.

5. A vehicle wheel as claimed to claim 4 having tubular extensions of said air and liquid inlet and outlet means, directed upwardly and downwardly respectively, in said reservoir.

6. A vehicle wheel as claimed in claim 1 wherein the communication between said reservoir and tire comprises at least one radial tube between the reservoir and tire, and means on the tube for causing transfer of liquid from the tire to the reservoir on rotation of the wheel.

7. A vehicle wheel as claimed in claim 1 wherein the communication between said reservoir and tire comprises at least one radial tube between the reservoir and tire, and means cooperating with the tube and within the tire elevating a quantity of liquid from the tire to the reservoir on each rotation of the wheel.

8. A vehicle wheel as claimed in claim 1 in which the wheel has side walls and a rim which form the liquid reservoir and tie rods holding the side walls together.

9. A vehicle wheel as claimed in claim 1 in which the wheel is hollow and the reservoir is attached to the side face of the wheel.

10. A vehicle as claimed in claim 1 in which the wheel has side walls and a rim, said rim having peripheral flanges and said side walls having ribs, said ribs and flanges cooperating with the tire to provide a tight fit therewith.

11. A vehicle wheel as claimed in claim 1 wherein the communication between said reservoir and tire comprises at least one radial tube between the reservoir and tire, and valve means on the tube opened when in its lowermost position to permit air pressure in the tire to force liquid from the tire into said reservoir.

References Cited in the file of this patent

UNITED STATES PATENTS

| | | |
|---|---|---|
| 1,246,443 | Lofland | Nov. 17, 1917 |
| 2,203,564 | Farnsworth | June 9, 1940 |
| 2,463,522 | Davidson | Mar. 18, 1949 |